(12) United States Patent
Puthenpura et al.

(10) Patent No.: US 9,848,337 B2
(45) Date of Patent: Dec. 19, 2017

(54) METRO CELL PLANNING

(71) Applicant: AT&T INTELLECTUAL PROPERTY I, L.P., Atlanta, GA (US)

(72) Inventors: Sarat Puthenpura, Berkeley Heights, NJ (US); Arun Jotshi, Parsippany, NJ (US); Sam Houston Parker, Cranbury, NJ (US); Ravi Raina, North Brunswick, NJ (US); Wenjie Zhao, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 193 days.

(21) Appl. No.: 13/682,543

(22) Filed: Nov. 20, 2012

(65) Prior Publication Data
US 2014/0141788 A1 May 22, 2014

(51) Int. Cl.
*H04W 16/18* (2009.01)

(52) U.S. Cl.
CPC .................... *H04W 16/18* (2013.01)

(58) Field of Classification Search
CPC ... H04W 84/045; H04W 16/12; H04W 16/18; H04W 16/32; H04W 16/02; H04W 24/00; H04W 24/02; H04W 88/08; H04W 92/20; H04W 16/06; H04W 16/28; H04W 24/08; H04W 28/04; H04W 36/0083; H04W 36/04
See application file for complete search history.

(56) References Cited

U.S. PATENT DOCUMENTS

| | | | | | |
|---|---|---|---|---|---|
| 5,940,471 | A | * | 8/1999 | Homayoun | H04M 3/2254 379/1.03 |
| 5,970,121 | A | * | 10/1999 | Homayoun | H04M 3/4228 358/405 |
| 6,032,105 | A | * | 2/2000 | Lee et al. | 702/57 |
| 6,157,830 | A | * | 12/2000 | Minde | H04W 24/00 455/226.1 |
| 6,169,896 | B1 | * | 1/2001 | Sant | H04W 24/00 379/9 |
| 6,201,960 | B1 | * | 3/2001 | Minde | H04W 24/00 455/424 |
| 6,477,367 | B1 | | 11/2002 | Kim | |
| 6,834,180 | B1 | * | 12/2004 | Marshall | 455/67.11 |

(Continued)

OTHER PUBLICATIONS

Alcatel Lucent, Strategic White Paper. Metro Cells—White Paper, http://www.google.com/url?q=http://www.alcatel-lucent.com/wps/DocumentStreamerServlet%3FLMSG_CABINET%3DDocs_and_Resource_Ctr%26LMSG_CONTENT_FILE%3DWhite_Papers/Metro_Cells_White_Paper.pdf&sa=U&ei=3pgpUebBMrK30gGhloGYBw&ved=0CBgQFjAA&usg=AFQjCNHdQdCcIIXxQW3pKXE3RXHfDdtBIQ, last accessed Feb. 23, 2012, 12 pages.

*Primary Examiner* — Matthew Sams
(74) *Attorney, Agent, or Firm* — Amin, Turocy & Watson, LLP

(57) ABSTRACT

Dynamic metro cell location planning is provided within the wireless communication coverage area of a macro cell. Metro cell location planning can include obtaining performance parameters associated with the macro cell and evaluating coverage parameters of the macro cell. Metro cell location planning can also include selecting, based on the performance parameters and the coverage parameters, a location within a wireless communication coverage area of the macro cell for placement of the metro cell. The selected location can be conveyed to a user and/or entity for deployment of the metro cells. Metro cells can be used by a carrier to fill a coverage hole and/or to offload capacity hot-spots within the network.

20 Claims, 10 Drawing Sheets

(56) References Cited

U.S. PATENT DOCUMENTS

| | | | |
|---|---|---|---|
| 7,203,489 B2* | 4/2007 | Saunders | 455/423 |
| 7,903,625 B1 | 3/2011 | Srinivas et al. | |
| 8,340,684 B2* | 12/2012 | Miura | 455/456.1 |
| 8,406,784 B2* | 3/2013 | Bodine | H04W 24/08 455/424 |
| 8,768,338 B2* | 7/2014 | Fuller et al. | 455/422.1 |
| 2003/0073442 A1* | 4/2003 | Fattouch | 455/446 |
| 2007/0066317 A1* | 3/2007 | Amft | H04W 16/18 455/446 |
| 2007/0077933 A1* | 4/2007 | El-Sayed et al. | 455/446 |
| 2008/0305747 A1* | 12/2008 | Aaron | H04B 17/309 455/67.13 |
| 2010/0075683 A1* | 3/2010 | Johansson et al. | 455/446 |
| 2010/0150027 A1* | 6/2010 | Atwal et al. | 370/254 |
| 2011/0287778 A1* | 11/2011 | Levin et al. | 455/456.1 |
| 2012/0108246 A1* | 5/2012 | Monogioudis | 455/446 |
| 2012/0252467 A1* | 10/2012 | Chen et al. | 455/446 |
| 2013/0040648 A1* | 2/2013 | Yang et al. | 455/446 |
| 2013/0053047 A1* | 2/2013 | Rai et al. | 455/448 |
| 2014/0149573 A1* | 5/2014 | Tofighbakhsh | H04L 41/5067 709/224 |

\* cited by examiner

METRO CELL PLANNING

TECHNICAL FIELD

The subject disclosure relates to wireless communications and, also generally, to metro cell planning in a wireless communications environment.

BACKGROUND

The wide adoption of mobile devices along with ubiquitous cellular data coverage has resulted in an explosive growth of mobile applications that expect always-accessible wireless networking. This explosion has placed strains on resources that are scarce in the mobile world. On the user side, dropped calls and poor communication have been blamed for user dissatisfaction. On the network side, instances of dropped calls and poor communication can occur due to the explosion in wireless demand and the limited amount of spectrum available to support the demand.

BRIEF DESCRIPTION OF THE DRAWINGS

Various non-limiting embodiments are further described with reference to the accompanying drawings in which.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Figure 1:
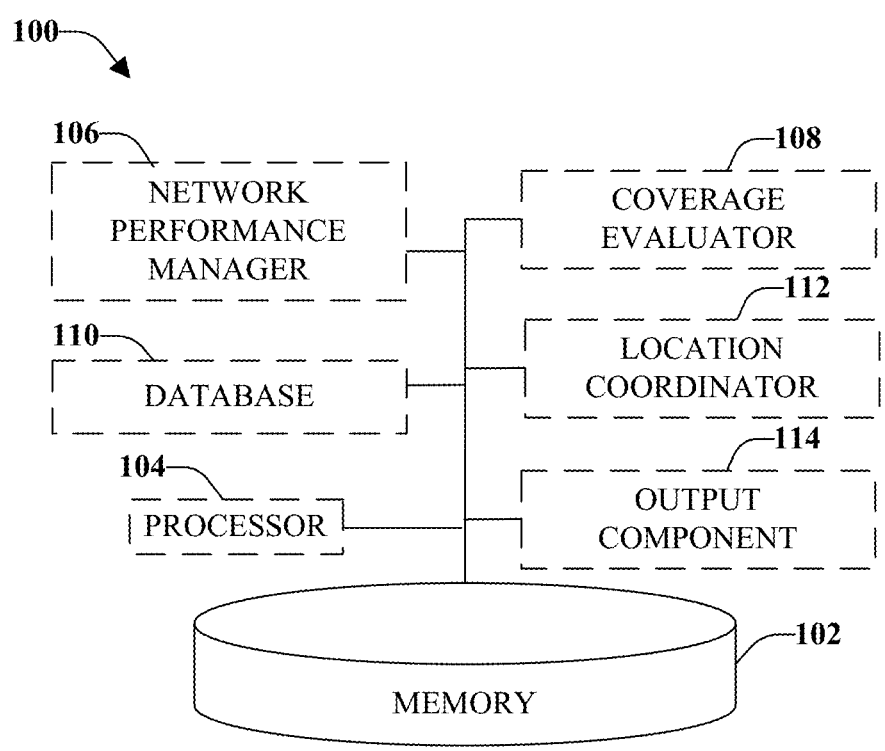
FIG. 1 illustrates an example, non-limiting system configured to facilitate metro cell planning in a wireless communications network, according to an aspect.

Referring initially to FIG. 1, illustrated is an example, non-limiting system 100 configured to facilitate metro cell planning in a wireless communications network, according to an aspect. Due to exploding wireless demand and the limited spectrum resources available (e.g., spectrum starvation), instances of poor communication can occur within a wireless communications network. The disclosed aspects can be utilized to address the increased user demand and quality of service by facilitating the placement of metro cells, or other small cells, within the wireless communications network. Throughout this description the terms "metro cells" and "small cells" are used synonymously. The placement of the small cells can be utilized to offload some of the network traffic from the macro cell(s), which might be overloaded or might not be able to provide coverage in certain places due to coverage holes, urban canyon conditions, and/or due to other factors. For example, one or more metro cells can be placed within a wireless communication coverage area of a macro cell.

Metro cells are public wireless access nodes (e.g., small cells, which can be similar to femto cells or to pico cells). Metro cells use the licensed spectrum and have lower coverage (e.g., a smaller geographic wireless communication coverage area) and serve a smaller number of users, as compared to macro cells. However, metro cells can offer greater coverage and capacity as compared to other small cells (e.g., femto cells, pico cells, and so forth). Metro cells can also provide a transparent capacity layer, which can complement the macro cell umbrella coverage layer. For example, the macro cell can cover a geographic range and within that geographic range, the metro cell(s) can provide more focused coverage for a subset of the geographic range.

In addition, metro cells can offer legacy support for circuit switched voice and UMTS (Universal Mobile Telecommunications System) packet data with standard 3G (Third Generation) handsets. Metro cells can also provide support for WiFi, UMTS, Long Term Evolution (LTE), and/or heterogeneous networks (HetNet).

It is noted that although various aspects and embodiments are discussed herein with respect to UMTS and/or LTE, the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As discussed herein, metro cells can be utilized to fill coverage holes and/or to offload network traffic from the macro network. Around ten to one hundred metro cells can be deployed in place of one macro cell. Metro cells can be installed relatively easily and are less subject to regulatory constraints as compared to macro cells. Further, metro cells emit very low emission power as compared to macro cells.

Metro cells can be used in both indoor situations and outdoor situations. In addition, metro cells can be suitable for high density places where additional capacity is needed. For example, hotspots, which are areas were a higher percentage of wireless usage occurs, can arise in various indoor places (e.g., convention center, shopping malls, universities, and so forth) or in various outdoor places (e.g., locations within a city, festivals, and so on). Metro cells can be controlled by a mobile service provider and can be implemented in a situation where wireless network traffic should be offloaded from a macro cell to a small cell (e.g., metro cell). It is noted that although the various aspects are discussed with respect to metro cells, the disclosed aspects can apply to other small cells that can be utilized for a network traffic offload situation and are not limited to metro cells.

Some network traffic offloading approaches relate to cell splitting, which can provide additional capacity within the region of the original cell site. Cell splitting is a process of sectioning the radio coverage of a cell site into two or more cell sites. In an example, the radio coverage area of a large cell site can be split by adjusting the power level and/or by using a reduced antenna height to reduce the wireless communication coverage area, which changes the radio frequency boundaries of the cell site. One or more new cell site(s) can then be added to the region to cover the remaining (original) coverage area of the original cell site. Such reduction in the radio coverage area has an effect similar to what would be produced by placing the cells further apart, which allows new cell sites to be added.

Cell splitting is not cost effective and does not address the capacity demand issue in a timely manner. The disclosed aspects can be configured to facilitate the deployment of small cells (also referred to as metro cells, micro cells, or pico cells) to off-load macro cells and to address coverage and quality issues. As previously noted, macros cells can be deployed relatively quickly and, therefore, the capacity demand issue can be resolved in a timely manner. In addition, small cells can be a good alternative to cell splitting because small cells are relatively less costly.

Other network traffic offloading approaches relate to carrier addition, which can provide additional capacity within the region of the original cell site. Carrier addition is a process of adding an extra layer of frequency at a cell site. In an example, the capacity of a large cell site can be increased by adding one or more carriers, which changes the capacity of the cell site. Carrier addition is also costly and time consuming as compared to small cells.

To plan small cells, system 100 can be configured to consider the traffic load on the macro cells that cover a given geographical area. At about the same time as the traffic load is considered, coverage holes and quality of service can also be considered. According to some implementations, backhaul options such as how to transfer the traffic from small cells (if implemented) to the core network can be considered. Thus, system 100 can be configured to surgically compute a potential location of small cells by taking into account various considerations in a holistic approach.

System 100 can include at least one memory 102 that can store computer executable components and instructions. System 100 can also include at least one processor 104, communicatively coupled to the at least one memory 102. Coupling can include various communications including, but not limited to, direct communications, indirect communications, wired communications, and/or wireless communications. The at least one processor 104 can facilitate execution of the computer executable components stored in the memory 102. The at least one processor 104 can be directly involved in the execution of the computer executable component(s), according to an aspect. Additionally or alternatively, the at least one processor 104 can be indirectly involved in the execution of the computer executable component(s). For example, the at least one processor 104 can direct one or more components to perform the operations.

It is noted that although one or more computer executable components may be described herein and illustrated as components separate from memory 102 (e.g., operatively connected to memory), in accordance with various embodiments, the one or more computer executable components could be stored in the memory 102. Further, while various components have been illustrated as separate components, it will be appreciated that multiple components can be implemented as a single component, or a single component can be implemented as multiple components, without departing from example embodiments.

System 100 can also include a network performance manager 106 that can be configured to collect network statistics from one or more macro cells. The one or more macro cells can be the existing cell sites and, for any given location, there can be multiple cell sites. The network statistics collected by the network performance manager 106 can be utilized to determine whether a particular macro cell is overloaded (e.g., there is more traffic in the coverage area of the cell site than can be adequately serviced). The network statistics can also be utilized to determine if there are coverage holes or urban canyon conditions, which are one or more portions of the wireless communication coverage area of the macro cell that do not receive coverage from the macro cells or the coverage can be received but the signal is not of sufficient strength.

In accordance with some aspects, OSS (Operations Support System) performance counters and/or statistics can be utilized by the network performance manager 106 to facilitate collection of the network statistics. In an example, the network performance manager 106 can collect the network statistics from an application (e.g., OSS manager) executing on a network device or on a device associated with the network, including from a third party source. In another example, the network performance manager 106 can obtain the network statistics directly, such as by an application executing within the system 100.

It is noted that although OSS performance counters are discussed, other performance counters and/or performance parameters can be obtained through the use of software, programs, or applications executing on (or associated with) the network. Such other performance counters and/or performance parameters can be utilized and the disclosed aspects are not limited to OSS performance counters.

The network performance manager 106 can also be configured to collect data related to the network as it is experienced by a user (e.g., through the respective user device). Obtaining data that relates to the user experience can complement the network statistics and can provide a more accurate assessment of the network performance. For example, the network statistics might indicate that a signal strength is adequate in a certain location, however, the user experience data might indicate that the signal strength is too low for communications (e.g., a communication cannot be initiated and/or received at a particular location). The network statistics would not have this information for locations were communications do not occur due to poor coverage (e.g., there was no communication so the network is not aware of what is occurring at that location).

In an implementation, an application can be executed on the user device that allows the user (or the respective user device) to provide feedback on the network experience. The feedback can be gathered and conveyed to the network performance manager 106. For example, the user device can send the information as it is determined (e.g., by the application running on the device) or at a different time, such as at predefined or random intervals. Additionally, the application executing on the device can receive updates related to enhancements of the network based on the feedback provided. Thus, at any location, the user can enter information into the application (e.g., data throughput is too slow, coverage is bad, dropped call, and so forth) and the information can be conveyed to the network performance manager 106.

In an alternative or additional implementation, the network performance manager 106 can obtain the data based on carrier IQ data. For example, an agent can be located (e.g., executing) on the device and the agent can send the information to the cell site (e.g., to network performance manager 106). The agent executing on the device can be configured to automatically evaluate the cell and send the information to the network performance manager 106. Such automatic evaluation and transmission can be performed without any action needed from the user. Network performance manager 106 can utilize the carrier IQ data to evaluate the cell.

System 100 can also include a coverage evaluator 108 that can be configured to determine the geographic wireless communication coverage area of one or more macro cells. For example, a radio frequency propagation model can be utilized in an attempt to predict the behavior of communications (e.g., transmission) in the area of existing cell sites. The prediction can be utilized to determine locations of any coverage holes or gaps in coverage. A coverage hole is an area within the wireless communication radio coverage of the cell (e.g., the coverage footprint of the cell) in which the radio frequency signal is below a designed threshold level. The coverage holes can be caused due to various physical obstructions, which can be manmade obstructions (e.g., buildings, tunnels, parking garages, and so forth) and natural obstructions (e.g., hills, trees, and so forth).

In an implementation, an Okumura-Hata model implementation can be utilized by the coverage evaluator 108 to determine the geographic wireless communication coverage area. An Okumura-Hata model (e.g., the Hata Model for Urban Areas) is a propagation model in free space and can incorporate its graphical information and develop the information further to realize the effects of diffraction, reflection, and scattering, which can be caused by buildings or other structures. The Okumura-Hata model can attempt to predict the total path loss along a communications link. It is noted that although an Okumura-Hata model is discussed herein, the disclosed aspects are not limited to this model and other radio frequency propagation models can be utilized with the various aspects.

Further, coverage evaluator 108 can be configured to determine whether a backhaul is feasible at various locations within the wireless communication coverage area (e.g., wireless communication coverage footprint) of the macro cell being evaluated. The various locations assessed by the coverage evaluator 108 can be the one or more potential locations for placement of the one or more small cells. The determination made by coverage evaluator 108 can relate to how network traffic will be transferred from the small cells to the core network if the small cells are placed in various areas of the wireless communication coverage area. The transfer of network traffic can be performed over a wireless backhaul link. Wireless backhaul links can include wired link components, such as a T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, a wireless backhaul link embodies an IuB interface.

If it is determined by the coverage evaluator 108 that the network traffic cannot be transferred from the small cell to the core network in a particular location, that particular location can be removed from consideration. On the other hand, if the location can be used to transfer the network traffic to the core network, as determined by the coverage evaluator 108, the location can be considered as a potential candidate for placement of a small cell.

The information gathered and/or determined by the network performance manager 106 and the coverage evaluator 108 can be retained in a database 110. It is noted that a database can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory.

Further, the information obtained/determined by network performance manager 106 and coverage evaluator 108 can be assessed by a location coordinator 112. In an implementation, location coordinator 112 can be configured to evaluate each of the network performance metrics, user experience metrics, cell coverage, and backhaul availability individually and together with each other to perform metro cell planning.

In an implementation, location coordinator 112 can divide the macro cell wireless communication coverage area into grids, wherein the size of the grids is determined based on a desired or defined granularity level. The grids can be scored individually based on the various parameters (e.g., network performance statistics, user experience, wireless communication coverage area, and backhaul availability). Based on the individual grid scoring, the location coordinator 112 can determine whether one or more grid areas should be combined and whether one or more metro cells should be placed within the one or more combined grid areas. According to an implementation, the grids are clustered based on the sizes and the ranks of the grids.

Further, the location coordinator 112 might determine, as a function of the scoring, that metro cells do not need to be placed in some grid areas. For example, it might not be cost effective to place a metro cell at a particular location or the score based on the various parameters described above does not warrant a small cell. These determinations can take into consideration policies or rules associated with a network operator or based on other criteria (e.g., business objectives, cost versus benefit determination, and so on).

In another implementation, weights can be assigned to each of the parameters such that various priorities can be placed on more desirable attributes, such that metro cells are placed in order to achieve the more desirable attributes. By assigning weights to each of the parameters, undesirable attributes can be penalized. For example, locations with a higher power utilization percentage can be preferred while locations with a lower power utilization percentage can be penalized. Further information related to scoring the grids and assigning various weights to each of the parameters will be described in further detail below.

The determination of potential locations of where to place the metro cell(s) can be conveyed to another device by an output component 114. For example, the potential locations can be provided to a network operator or another user and/or entity as a result of a request for information related to potential locations. The request can be an explicit request or an implicit request (which can be an inferred request). As utilized herein a user and/or entity can be, for example, the Internet, the system (or another system), a computer, machinery, a human, an actor, a commercial enterprise, and so forth, and is hereinafter referred to as users and/or entity, depending on the context.

In another implementation, the potential locations can be conveyed by the output component 114 automatically when system 100 detects one or more overload conditions, or a potential for an overload situation and/or based on other factors (e.g., a large number of dropped calls occurring at a particular location, construction of a building or other structure, user dissatisfaction, and so forth.) Further to this implementation, system 100 can continuously, periodically, at variable intervals, or based on other parameters (e.g., at least a set of the data has changed, new data has been entered, a query has been executed on the data, and so forth) monitor one or more of the parameters. If a change has been detected, a notification can be sent (e.g., by output component 114) that one or more metro cells are recommended as well as recommendations related to one or more potential locations for the metro cell(s).

Figure 2:
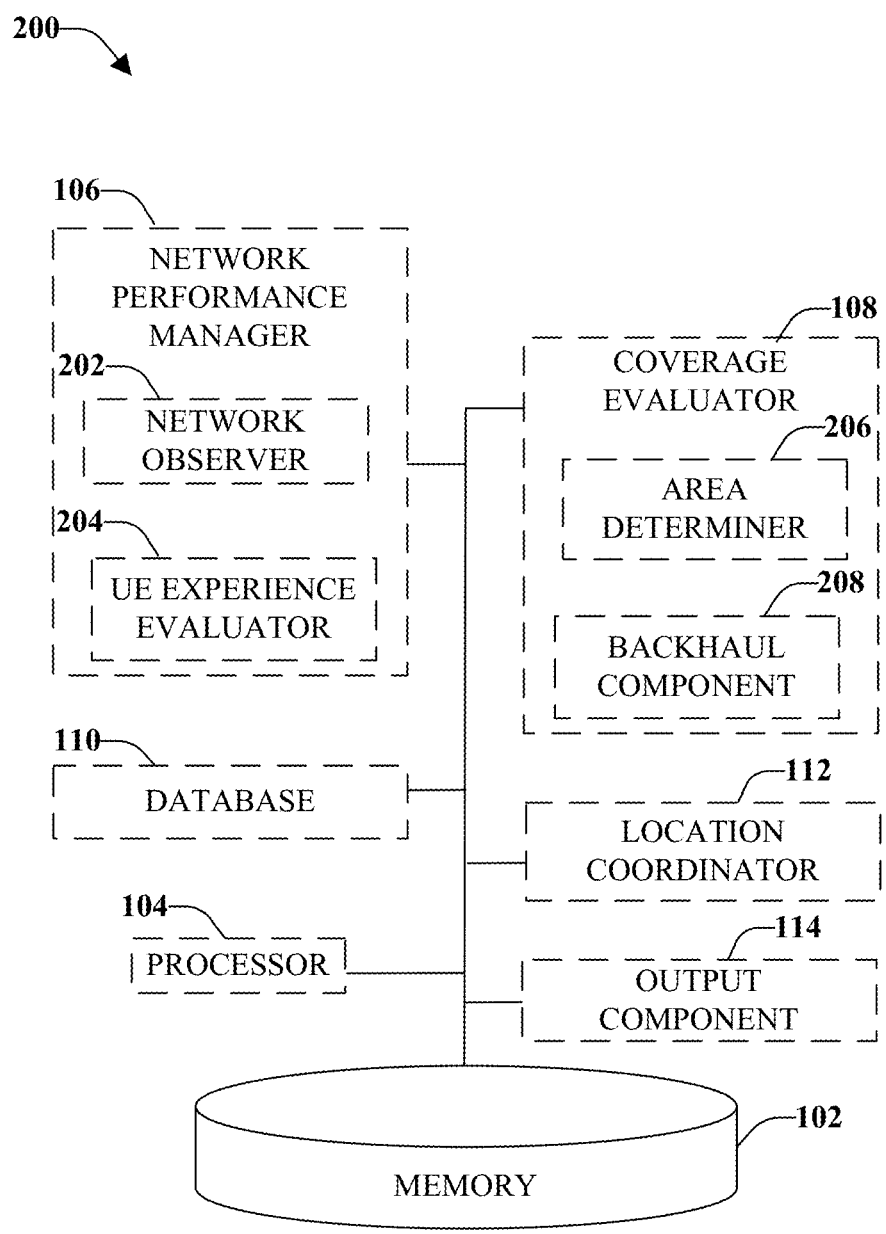
FIG. 2 illustrates an example, non-limiting system configured to facilitate planning locations for one or more small cells in a wireless communication coverage area of a macro cell, according to an aspect.

FIG. 2 illustrates an example, non-limiting system 200 configured to facilitate planning location(s) for one or more small cells in a coverage footprint of a macro cell in order to more fully utilize the available spectrum, according to an aspect. Based on various parameters associated with a cell site, it might be determined by system 200 that it would be beneficial for one or more small cells (e.g., metro cells) to be placed in locations under the umbrella coverage of the cell site (e.g., macro cell). Such small cells can be configured to handle at least a subset of the traffic, which can free resources on the cell site. According to another aspect, the small cells can be configured to provide coverage where the cell site cannot reach due to coverage holes, urban canyon conditions, or due to other factors.

System 200 can include a network observer 202 that can be configured to observe one or more performance metrics within a wireless communications network. In an implementation, network observer 202 can be configured to evaluate the spectrum utilization. In another implementation, network observer 202 can be configured to observe the load of each macro cell and/or a traffic forecast. In a further implementation, the network observer 202 can be configured to evaluate a quality of service level of the macro cells and/or various network quality indicators. Other examples of performance metrics that can be evaluated by network observer 202 include, but are not limited to the number of packets dropped during a defined interval, the number of packets received during a defined interval, and/or the number of packets transmitted during a defined interval. Other examples can include the average rate at which data was received during a defined interval (e.g., bandwidth of the network) and/or the average rate at which data was transmitted during a defined interval (e.g., bandwidth of the network). Another performance metric can include network utilization, which can be defined as the combined transmit and receive rates during a defined interval. Performance metrics in addition to, or in place of, the performance metrics discussed above can be evaluated by network observer 202, according to an aspect. According to some aspects, network observer 202 can include, or can access, OSS performance counters and statistics to evaluate the network parameters.

Also included in system 200 is a user equipment (UE) experience evaluator 204 that can be configured to assess the network performance from the perspective of the mobile device (e.g., user equipment). In an implementation, data can be collected from one or more Application Program Interfaces (API) executing on the mobile device. Such APIs can collect the data based on input received from a user (e.g., through a user interface, such as a touch screen, a keypad, a keyboard, a microphone, and so forth). For example, if the user is having problems (e.g., poor coverage, dropped calls, and so on), the user can interact with the API and provide information related to the problem.

According to another implementation, data can be collected autonomously by the mobile device (e.g., without user intervention). For example, if a detected signal strength is weak, the information related to the weak signal can automatically be recorded and conveyed to the UE experience evaluator 204 and/or to another device.

At substantially the same time as the information is provided (either manually or automatically), location information associated with the mobile device can also be provided. The location information can be derived from a GPS module (e.g., from a GPS enabled device) or through other location determination techniques. The UE experience evaluator 204 can ascertain locations with poor coverage, or other undesirable user experience consequences (such as slow data rates, etc.), in order to ascertain whether a particular location is providing a poor user experience as well as the type of issue that is causing user dissatisfaction.

System 200 can also include an area determiner 206 that can be configured to access the wireless communication coverage area (or wireless communication coverage footprint) of the macro cell under consideration. The area determiner 206 can also locate any holes in the wireless communication coverage area based in part on the information derived by the coverage evaluator 108. Area determiner 206 can also be configured to access the wireless communication coverage area of the macro cell to determine if there are hot spots, which are areas where the number of user devices using the available spectrum is near a maximum level for which coverage is adequate.

Also included in system is a backhaul component 208 that can be configured to access one or more potential locations and determine whether communications from that location can be conveyed back to the macro carrier's own network (such as a MTSO (Mobile Telephone Switching Office) or a Data Center). Backhaul could be achieved by one of many available options such as Fiber Backhaul, Microwave (with Line-of-Site or without Line-of-Site) Backhaul, Copper Backhaul, or Third Party leasing backhaul option. For example, backhaul component 208 can access a coverage hole and determine if a small cell, transmitting at a certain power level, would be heard by receive antennas of the macro cell. In some cases, the backhaul would not be feasible at the potential location, such as due to blockage of the signal by a structure. If the backhaul link is not available, the location is discarded as a potential location. Backhaul might also not be feasible due to cost limitations, wherein the potential backhaul option is far away and hence will require a significant capital investment.

The location coordinator 112 can utilize the gathered information, including availability of the backhaul link, in order to determine where small cells should be placed. For example, location coordinator 112 can facilitate ranking locations within the macro cell wireless communication coverage area in order to choose the appropriate number of small cells to be placed in the umbrella of the macro cell wireless communication coverage area. For example, the number of small cells to be deployed might be limited in order to meet various operating considerations (e.g., budget constraints, licensing considerations, environmental considerations, and so on). However, according to some implementations, there might not be limits placed on the number of small cells that can be deployed. In these situations, it might be cost beneficial to deploy only the actual number of small cells that are needed and placement of those small cells at the best locations in order to improve the user experience and provide coverage appropriate for the user demand.

Figure 3:
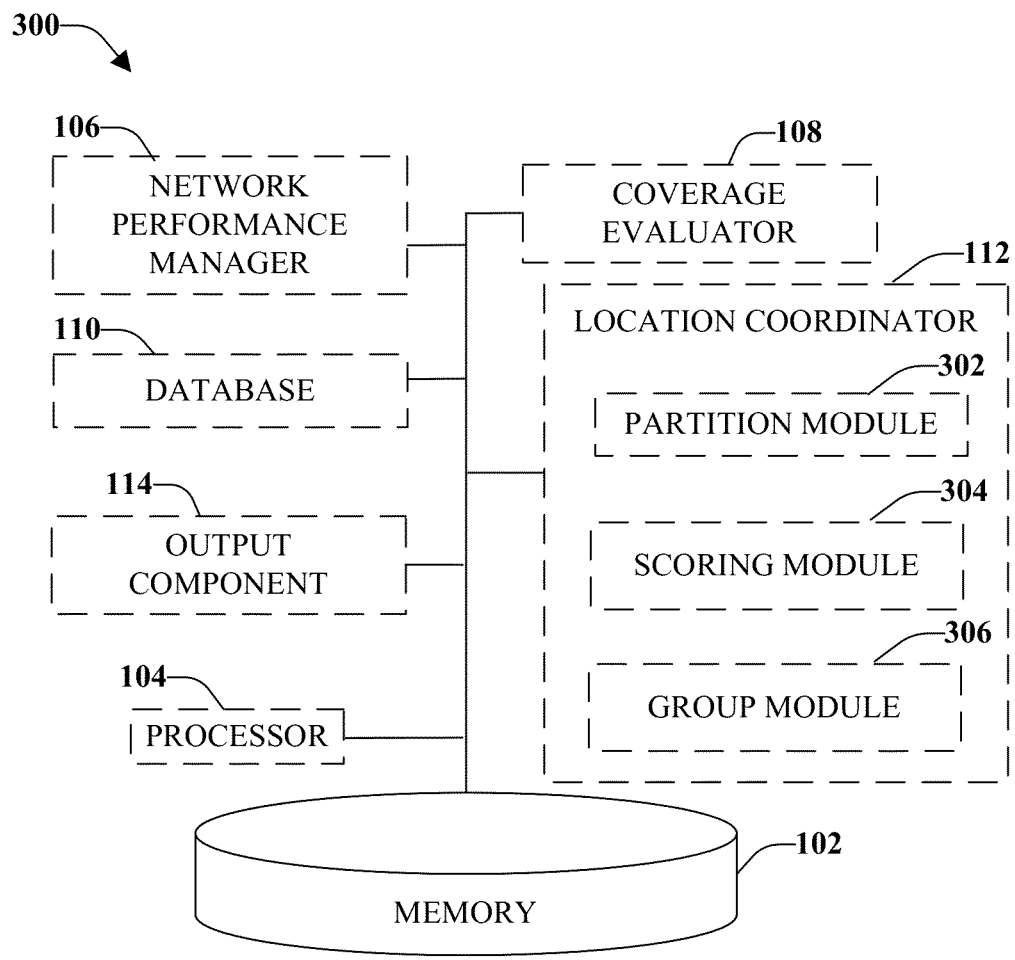
FIG. 3 illustrates an example, non-limiting system configured to determine the number of small cells to be deployed as well as the location where the small cells should be placed, according to an aspect.

FIG. 3 illustrates an example, non-limiting system 300 configured to determine the number of small cells to be deployed as well as the location where the small cells should be placed, according to an aspect. System 300 can include a partition module 302 that can be configured to divide the coverage footprint of a macro cell into a plurality of sections, referred to herein as "grids". The size of each grid can be a function of a desired granularity level. For example, for precise analysis of the coverage footprint, each grid area can be relatively small (e.g., 24 meters by 25 meters, 50 meters by 30 meters, and so forth). For less precise analysis of the coverage footprint, each grid area can be larger (e.g., 100 meters by 75 meters, 125 meters by 125 meters, and so forth). The smaller the grid area results in the coverage footprint being divided into more grids.

Figure 4:
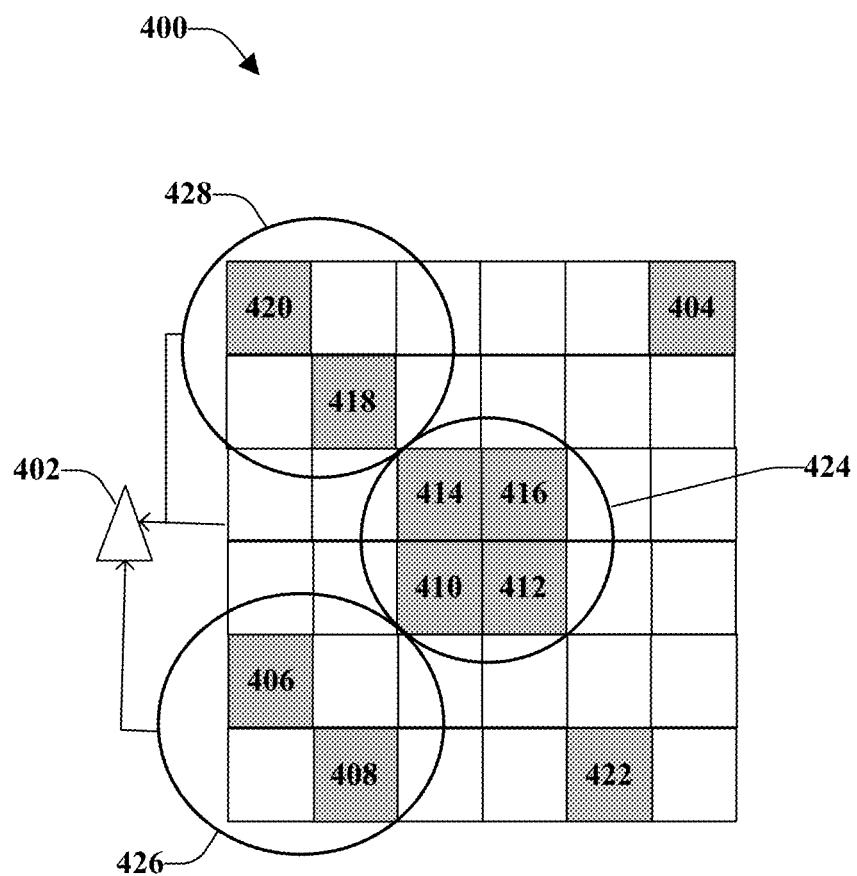
FIG. 4 illustrates an example, non-limiting schematic representation of a wireless communication coverage area divided into a plurality of grids, according to an aspect.

For purposes of explanation, FIG. 4 illustrates an example, non-limiting schematic representation of a coverage footprint 400 divided into a plurality of grids, according to an aspect. The coverage footprint of the access point or macro cell 402 is the area for which the macro cell 402 is designed to serve. In this example, the coverage footprint 400 is represented as a square and each grid is represented as a small square within the coverage footprint 400. It is noted that although the coverage footprint 400 and grids are represented as squares, the disclosed aspects can be utilized with a coverage footprint that comprises a different geographic shape and/or a geographic shape that is irregular.

With continuing reference to FIG. 3, system 300 also includes a scoring module 304 that can be configured to score or rank each grid based on the parameters determined by network performance manager 106 and coverage evaluator 108. For example, the scoring module 304 can create a grid scoring model that collectively or individually scores each grid area based on scoring parameters, which can be configurable scoring parameters. According to an implementation, scoring module 304 can be configured to score each grid based on a predicted coverage, a customer experience, a network performance, or combinations thereof.

According to some implementations, the scoring module 304 can also rank the various parameters based on a weight that can be assigned to one or more of the parameters. For example, a first set of weights can be assigned, by scoring module 304, to performance parameters represented by performance parameter data and a second set of weights can be assigned to coverage parameters represented by the coverage parameter data. Each of the grids can be ranked with respective ranks based on the first set of weights and the second set of weights.

The weight(s) can be predefined and/or can be configurable such that desirable parameters are given a higher weight (where a higher weight indicates better aspects) than undesirable parameters. According to some implementations, however, a lower weight is more desirable than a higher weight, depending on how the parameters are configured. The weights can be assigned in order that locations having more desirable attributes are preferred and locations having less desirable attributes are penalized.

For example purposes and not limitation, the following will provide examples of some weights that can be applied to each grid. It is noted that the numbers and weight factor used for each parameter are for example purposes only and the actual implementation of scoring and weights can be different than those discussed below. For example, instead of having three classes for a given parameter, there could be five, seven, or any number of classes and each class could have a different weight.

For weighting of predicted coverage, if the RSCP (received signal code power) is less than negative ninety (RSCP<−90) dbm, the weight can be ten (10). If the RSCP is between negative seventy (−70) dbm and negative eighty-nine (−89) dbm, the weight can be five (5). If the RSCP is less than negative seventy (−70) dbm, the weight can be one (1).

For weighting of customer experience, different weights can be assigned if the customer provides the information as compared to if the information is dynamically provided (e.g., by the user equipment). If the information is provided by the user (e.g., through an application executing on the user equipment), the grid can be weighted based on a weighted sum, with weights of ten (10), five (5), and one (1). If the information is dynamically reported by the user equipment (e.g., through the execution of CIQ incidents), the grid can be weighted based on the voice RSCP. For example, if the voice RSCP is less than negative ninety (<−90) dbm, the weight can be ten (10). If the voice RSCP is negative seventy (−70) dbm to negative eighty-nine (−89) dbm, the weight can be five (5). If the voice RSCP is less than negative seventy (−70) dbm, the weight can be one (1).

For weighting by network performance, the weights can be different based on whether the network performance is for power utilization or for accessibility/retainability. For power utilization, if the power utilization is more than seventy-five percent (>75%), the weight can be ten (10). If the power utilization is between fifty percent (50%) and seventy-five percent (75%), the weight can be five (5). Further, if the power utilization is less than fifty percent (<50%), the weight can be one (1).

For weighting of the network performance based on accessibility/retainability, if the amount if less than ninety-seven point five percent (<97.5%), the weight can be ten (10). If the amount is between ninety-seven point five percent (97.5%) and ninety-eight point five percent (98.5%), the weight can be five (5). If the amount is more than ninety-eight point five percent (98.5%), the weight can be one (1).

As noted, the parameters and associated weights discussed above are for example purposes only. Thus, the parameters and associated weight implemented through use of the disclosed aspects can be different than those discussed herein.

System 300 can also include a group module 306 that can be configured to cluster the grids. For example, a clustering algorithm can be utilized that takes into account a wireless communication coverage area of the metro cell. For example, if a wireless communication coverage area of a metro cell is of radius 300 meters and the coverage area is divided into grids of 100 meters, the metro cell can cover thirty-six grids. In another example, if the grid area matches the wireless communication coverage area of the metro cell, each grid can be a potential location for a metro cell.

Illustrated in FIG. 4 are shaded grids 404 through 422, which represent the grids that have a better ranking than the other grids (e.g., the non-shaded grids). According to an implementation, the determination of whether a grid has a better ranking than another grid can be performed by group module 306 based on a comparison among the grids. In accordance with another aspect, the group module 306 can determine that one or more grids have a higher ranking than the other grids based on a review of the ranking of each grid. If the ranking satisfies a condition with respect to a ranking level, the grid can be determined to have a better ranking compared to other grids. Determining whether the grid ranking satisfies the condition can be performed individually for each grid, regardless of the rankings of the other grids.

Group module 306 can cluster the grids having the better rankings. The clustering of qualifying grids can be utilized to estimate metro cell cluster location(s). For example, group module 306 can cluster grids 410, 412, 414, and 416, represented by first cluster 424 (e.g., the grids within the circle). Another cluster of grids includes grids 406 and 408, represented by second cluster 426. Grids 418 and 420 represent a third cluster 428.

Although grids 404 and 422 have a better ranking than other grids (e.g., the grids without shading), since these are single grids 404, 422 and are not near other qualifying grids (e.g., grids having a higher ranking), group module 306 does not cluster the grids 404 and 422. Thus, clusters with a low number of qualifying grids can be dropped (e.g., not clustered by group module), according to an aspect, since it might not be cost effective to group these grids (e.g., place a small cell near the location represented by the cluster).

Figure 5:
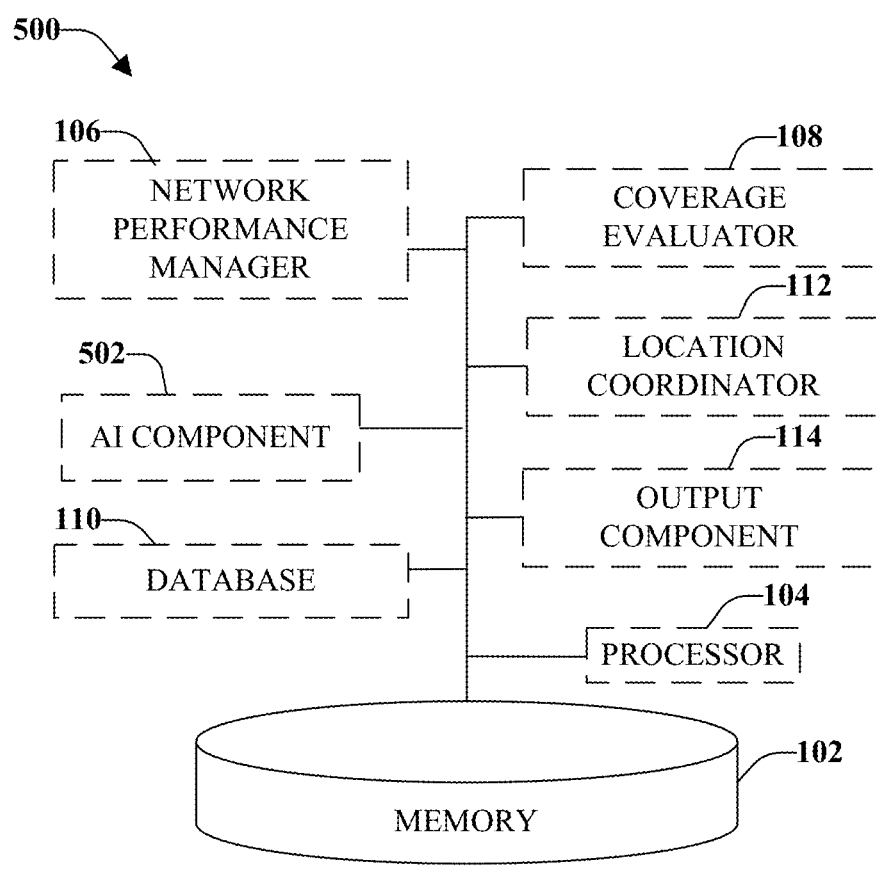
FIG. 5 illustrates an example, non-limiting system that employs an artificial intelligence component, which can facilitate automating one or more features in accordance with the disclosed aspects.

FIG. 5 illustrates an example, non-limiting system 500 that employs an artificial intelligence (AI) component 502, which can facilitate automating one or more features in accordance with the disclosed aspects. A memory 102, a processor 104, a network performance manager 106, a coverage evaluator 108, a database 110, a location coordinator 112, and an output component 114, as well as other components (not illustrated) can include functionality, as more fully described herein, for example, with regard to the previous figures. The disclosed aspects in connection with small cell location planning can employ various AI-based schemes for carrying out various aspects thereof. For example, a process for reviewing network performance parameters, user network experience parameters, computing macro cell coverage parameters, and determining locations where metro cells could be placed within the umbrella coverage of a macro cell can be facilitated with an example automatic classifier system and process. In another example, a process for penalizing one or more parameters while preferring other parameters (e.g., ranking or weighting) can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed. In the case of communication systems, for example, attributes can be a coverage of macro cells, load on the macro cells, and quality of service and the classes can be whether a backhaul link is available.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing network usage, observing network performance statistics, and so on). For example, SVMs can be configured via a learning or training phase within a classifier constructor and feature selection module. Thus, the classifier(s) can be used to automatically learn and perform a number of functions, including but not limited to analyzing parameters, assigning weights to one or more of the parameters, scoring grids, clustering grids, and so forth. The criteria can include, but is not limited to, predicted coverage, power utilization, and accessibility/retainability, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 6:
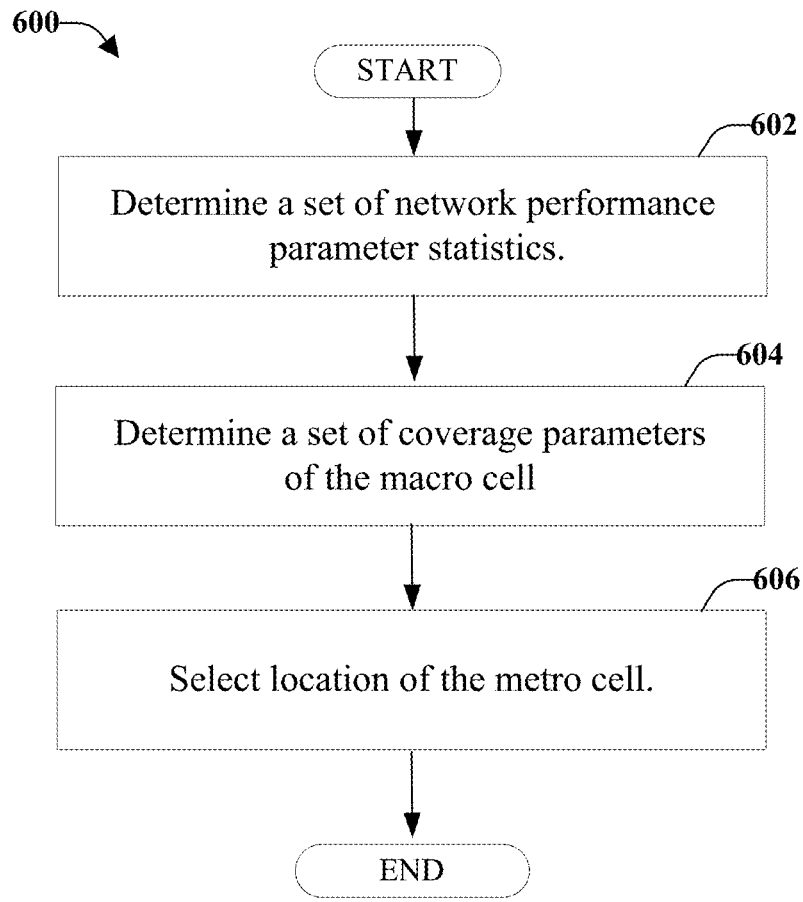
FIG. 6 illustrates an example, non-limiting method for metro cell planning in a wireless communications network, according to an aspect.

FIG. 6 illustrates an example, non-limiting method 600 for metro cell planning in a wireless communications network, according to an aspect. Method 600 can be configured to determine a location of one or more metro cells while considering coverage holes associated with the macro cell as well as backhaul options. The location determination can be made in order to improve quality and/or off-load traffic from the macro cell.

Method 600 starts, at 602, when a set of network performance parameter statistics for a macro cell are determined. The set of network performance statistics can define statistics regarding performance of the macro cell associated with communication of the macro cell and other network devices. According to an implementation, determining the set of network performance parameter statistics can include obtaining operation support system performance counters for the macro cell. Determining the set of network performance parameter statistics can also include evaluating customer experience statistics received from a mobile device within a wireless communication coverage area of the macro cell.

At 604, a set of coverage parameters of the macro cell are determined. The set of coverage parameters can define parameters that represent a location within the wireless communications coverage area of the macro cell where communication between the macro cell and the other network devices does not meet a defined quality of service level. According to an aspect, determining the wireless communications coverage area of the macro cell includes processing model data representing a radio frequency propagation model. According to an implementation, the model data represents an implementation of an Okumura-Hata model.

A location for the metro cell is selected, at 606. The selection can be based on the set of network performance parameter statistics and the set of coverage parameters. The selection can also be made based on whether a communication path exists between the macro cell and a carrier network (e.g., availability of a backhaul link). The location for the metro cell is within a wireless communications coverage area of the macro cell. The selection of the metro cell can include ranking of each of the portions. In an example, the ranking can be based, in part, on weight applied to the network performance parameter statistics and the coverage parameters. In another example, clustering of the portions can be performed before the location is selected.

According to another implementation, the location for the metro cell can include availability of a backhaul link representing a communication path between the macro cell and the metro cell. For example, the set of coverage parameters can include availability of a backhaul link at the selected location, which can indicate whether a small cell, placed at a particular location, would be able to communicate back to the carrier's own network (such as a MTSO or a Data Center). If the backhaul link is not available (e.g., the small cell will not be able to communicate with the network), the location is removed from consideration as a potential location. If the backhaul link is available (e.g., the small cell will be able to communicate with the network), the location is retained as a potential location candidate.

Figure 7:
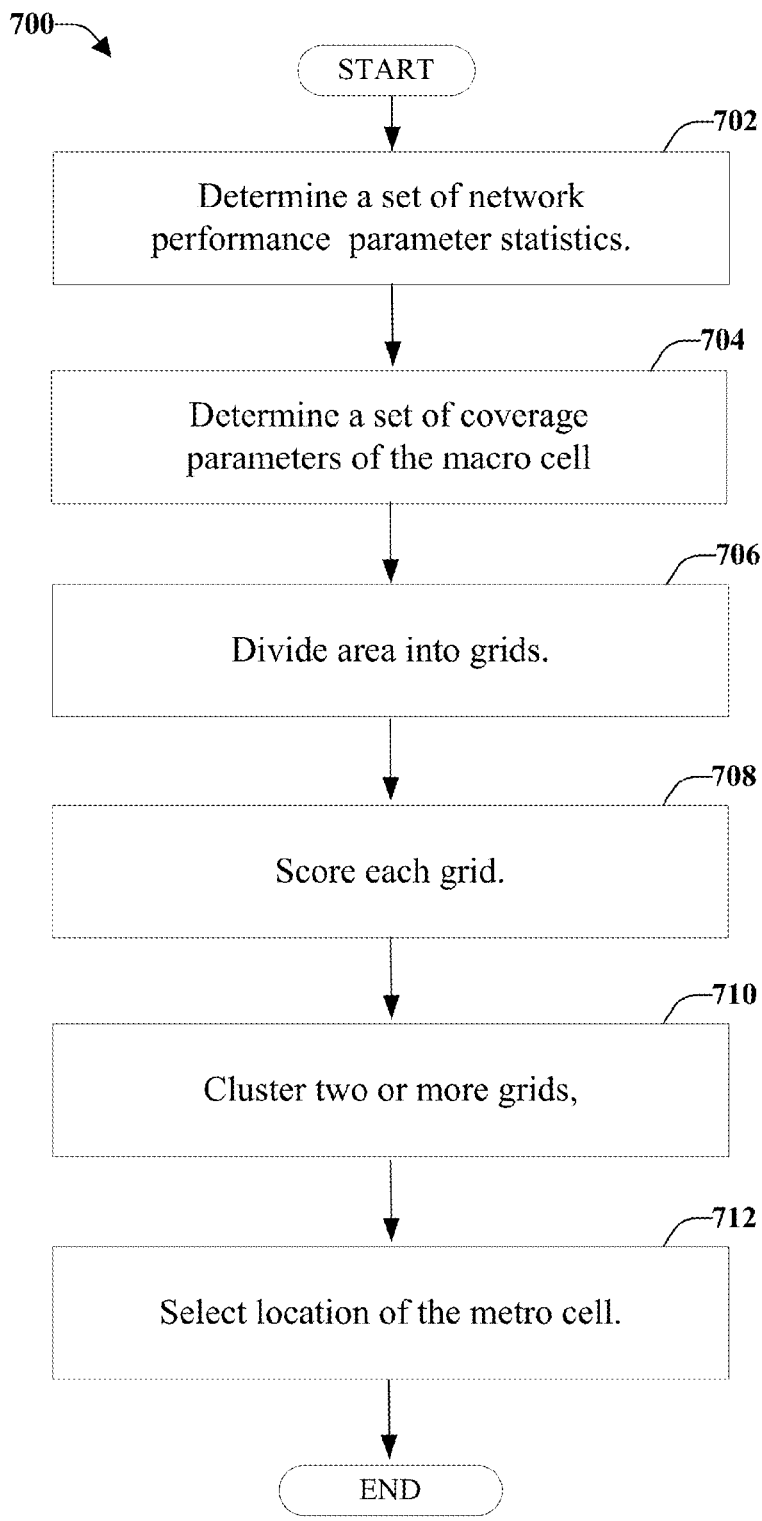
FIG. 7 illustrates an example, non-limiting method for metro cell placement, according to an aspect.

FIG. 7 illustrates an example, non-limiting method 700 for metro cell placement, according to an aspect. Method 700 starts, at 702, when a set of network performance parameters statistics are determined. For example, the set of network performance parameter statistics can be collected from the macro cells. The set of network statistics can be gathered from all the macro cells within a geographic area (e.g., an entire city, a portion of a city, a specific location). The set of network statistics collected can identify which macro cells are performing at an expected (or better than expected) performance level as well as which macro cells are having performance issues (e.g., not performing at the expected level). The set of network statistics collected can include power utilization and/or accessibility/retainability.

According to an implementation, the set of network performance parameter statistics can include customer experience statistic data from a mobile device. The customer experience statistic data can be based on the network performance from the perspective of the mobile device (or device user). The data can be obtained based on the user entering information into their device (e.g., using an application executing on the device) and/or based on the device automatically reporting information related to the network (e.g., through an application executing on the device, through the use of an agent executing on the device, and so on).

At 704, a set of coverage parameters of the macro cell are determined. The set of coverage parameters can include a predicted coverage that can be computed using a radio frequency propagation model, for example. According to an implementation, the set of coverage parameters can include information related to identification of locations where a backhaul link is feasible. For example, for the region that is being studied, a determination is made whether (or not) a backhaul link is available, where the backhaul link represents an available communication path between the metro cell and the carrier's own network (such as a MTSO or a Data Center)

The coverage footprint of the macro cell is divided into portions (e.g., grids), at 706. The size of each grid can be selected based upon a desired granularity level of the analysis. Each of the portions can be ranked or scored, at 708, based on the set of network performance parameter statistics and the set of coverage parameters.

According to an implementation, scoring each grid, at 708, can include applying weights to the network performance parameter statistics and the coverage parameters. The portions can be analyzed based on the weights. For example, the weights can be configurable and can be selected based on which parameters are deemed to be more beneficial. For example, the weight can be applied such that locations having desirable attributes are preferred while locations having undesirable attributes are penalized.

According to an aspect, clustering is applied, at 710, before the location is selected, at 712. For example, a determination can be made that two portions are adjacent and comprise respective rankings that are determined to be similar. The two portions can be grouped as a grouped portion and the grouped portion can be selected for the location of the metro cell. One or more locations for placement of a metro cell can be recommended to a network operation or to another user and/or entity.

Figure 8:
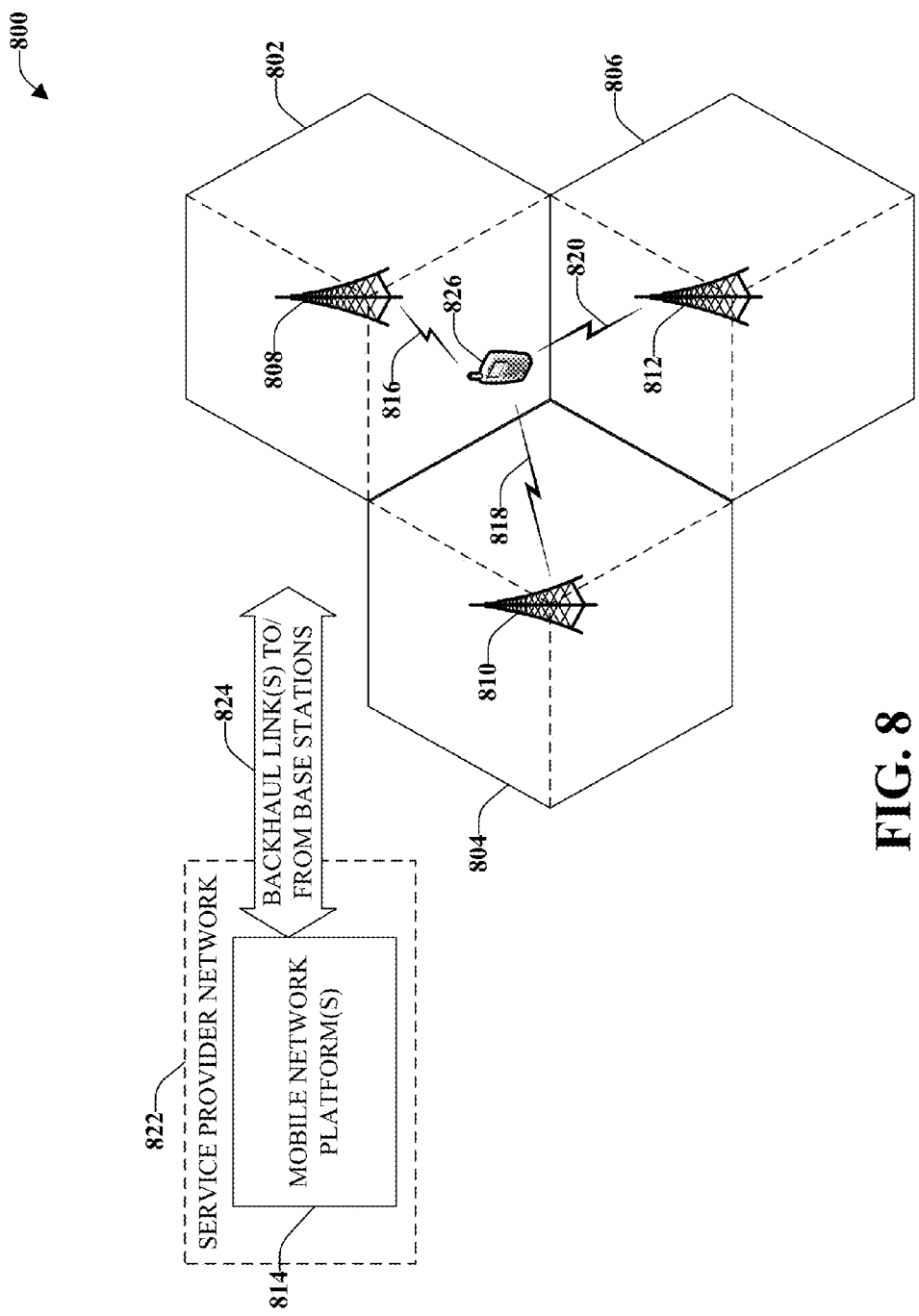
FIG. 8 is a schematic example wireless environment that can operate in accordance with aspects described herein.

By way of further description with respect to one or more non-limiting ways to offload network traffic from macro cells, FIG. 8 is a schematic example wireless environment 800 that can operate in accordance with aspects described herein. In particular, example wireless environment 800 illustrates a set of wireless network macro cells. Three coverage macro cells 802, 804, and 806 include the illustrative wireless environment; however, it is noted that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a 2π/3 configuration in which each macro cell includes three sectors, demarcated with dashed lines in FIG. 8. It is noted that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered an eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 816, 818, and 820 embody a Uu interface (UMTS Air Interface).

Mobile network platform(s) 814 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 822 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.) Moreover, wireless network platform(s) can integrate disparate networks (e.g., Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 814 can be embodied in the service provider network 822.

In addition, wireless backhaul link(s) 824 can include wired link components such as T1/E1 phone line; T3/DS3 line, a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 824 embodies IuB interface.

It is noted that while exemplary wireless environment 800 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 9:
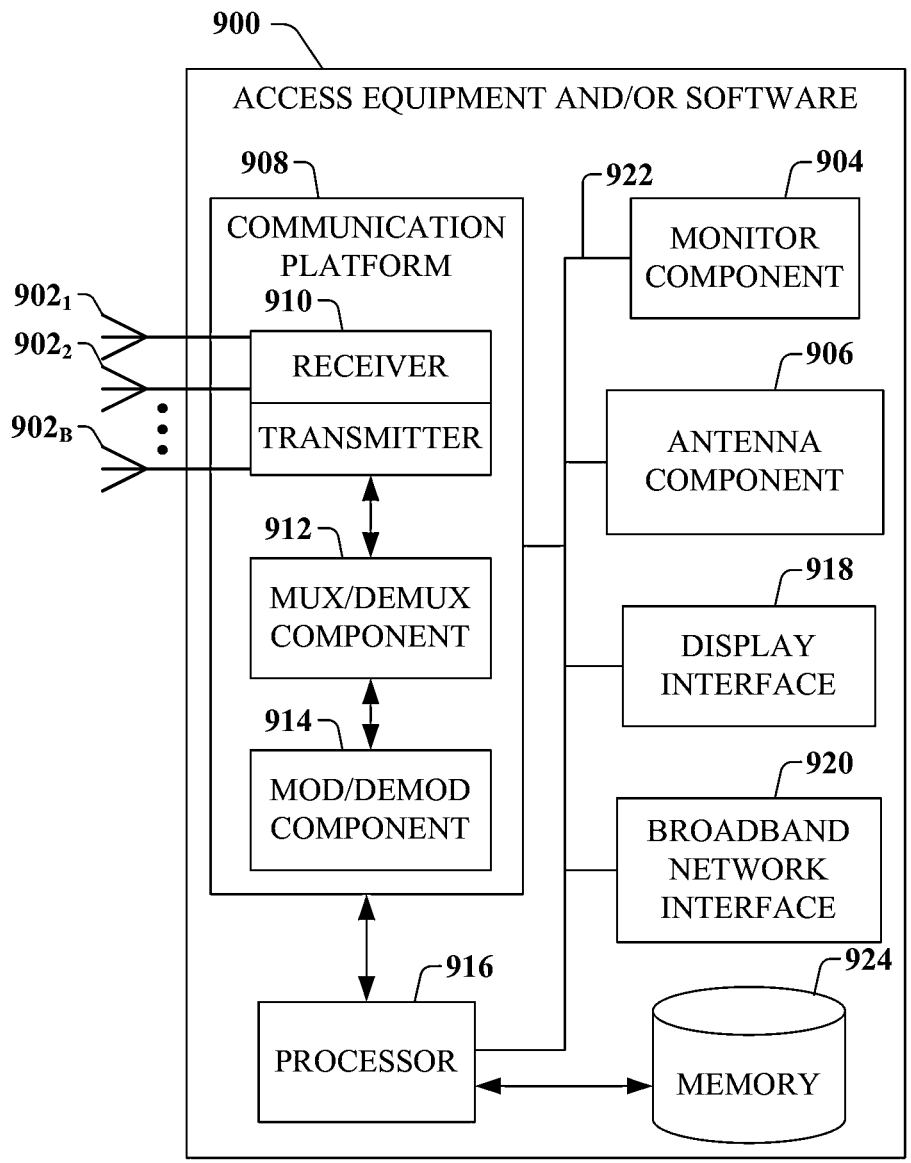
FIG. 9 illustrates a block diagram of access equipment and/or software related to access of a network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femtocell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be an LCD (Liquid Crystal Display), a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., 3GPP UMTS, GSM, and so on.) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)), access list(s) that authorize access to wireless coverage through access equipment and/or software 900, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software 900.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 924, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 10:
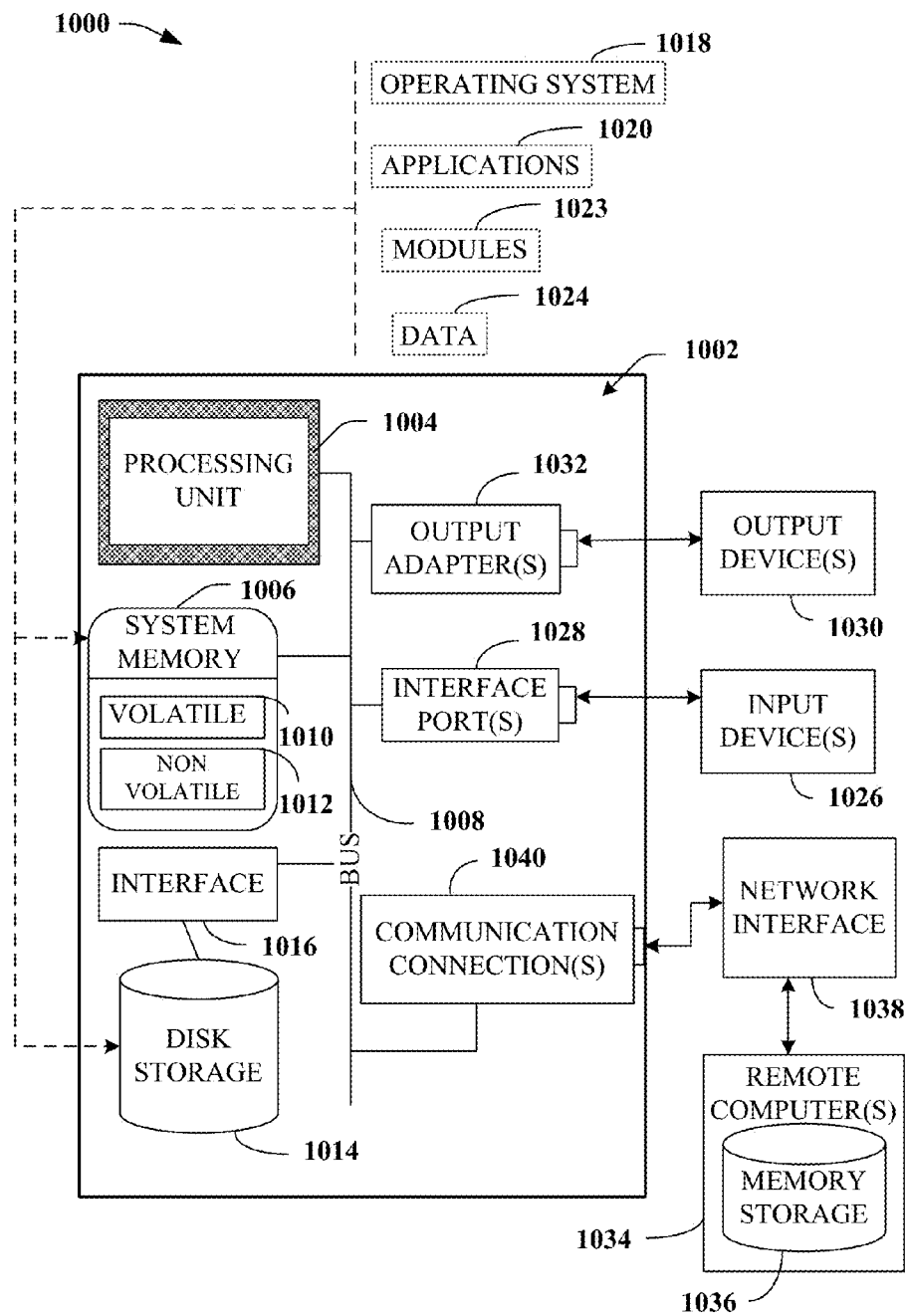
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 102) there can be software, which can instruct a processor (such as processor 104) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1006 includes volatile memory 1010 and nonvolatile memory 1012. A basic input/output system (BIOS), containing routines to transfer information between elements within computer 1002, such as during start-up, can be stored in nonvolatile memory 1012. By way of illustration, and not limitation, nonvolatile memory 1012 can include ROM, PROM, EPROM, EEPROM, or flash memory. Volatile memory 1010 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1002 also includes removable/non-removable, volatile/non-volatile computer storage media. In an implementation, provided is a non-transitory or tangible computer-readable medium storing computer-executable instructions that, in response to execution, cause a system including a processor to perform operations. The operations can include evaluating network performance statistic data associated with a macro cell representing a quality of service performance level of the macro cell and coverage parameter data of the macro cell representing a coverage characteristic of the macro cell. The operations can also include dividing a wireless communication coverage area of the macro cell into subsets of coverage and ranking the subsets of coverage based on the network performance statistic data and the coverage parameter data. Further, the operations can include generating a recommended location, within the wireless communication coverage area of the macro cell, for deployment of a metro cell based on the ranking.

According to an implementation, the operations further comprise clustering two adjacent subsets of coverage based on the ranking and a wireless communication coverage area of the metro cell. For example, if the coverage area of the metro cell encompasses an area larger than a single grid, multiple grids can be combined, wherein the metro cell can provide wireless communication coverage for the area represented by the combined grids. Additionally or alternatively, according to an implementation, the operations further comprise determining a backhaul link is available at the location, wherein the backhaul link represents a communication path between the metro cell and the carrier's own network (such as a MTSO or a Data Center).

FIG. 10 illustrates, for example, disk storage 1014. Disk storage 1014 includes, but is not limited to, devices such as a magnetic disk drive, floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to system bus 1008, a removable or non-removable interface is typically used, such as interface component 1016.

It is to be noted that FIG. 10 describes software that acts as an intermediary between users and computer resources described in suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1022 and program data 1024 stored either in system memory 1006 or on disk storage 1014. It is to be understood that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus (USB). Output device(s) 1030 use some of the same type of ports as input device(s) 1026.

Thus, for example, a USB port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It is also noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network PC, a workstation, a microprocessor based appliance, a peer device, or other common network node and the like, and typically includes many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
a processor; and
a memory that stores executable instructions that, when executed by the processor, facilitate performance of operations, comprising:
  partitioning a wireless communication coverage area of a macro cell device into grids;
  in response to determining that a customer input has been received from a mobile device within a first grid of the grids, and a device input has been received, without the customer input, from the mobile device within a second grid of the grids, translating the customer input into a first weighted value of a weighted scale to facilitate assignment of the first weighted value to the first grid and translating, according to a measured power of a communication channel, the device input into a second weighted value of the weighted scale to facilitate assignment of the second weighted value to the second grid; and
  in response to ranking the first grid according to the first weighted value and the second grid according to the second weighted value, selecting a location with a highest ranking within the grids for placement of a metro cell device that is associated with a first power emission that is lower than a second power emission of the macro cell device.

2. The system of claim 1, wherein the partitioning comprises selecting sizes of the grids based on defined granularity levels.

3. The system of claim 1, wherein the operations further comprise:
  assigning a third weighted value of the weighted scale to performance parameter data corresponding to a diffraction of a wireless signal that has been caused by a structure.

4. The system of claim 3, wherein the operations further comprise:
  ranking a third grid according to the third weighted value.

5. The system of claim 3, wherein the operations further comprise clustering the grids based on the third weighted value.

6. The system of claim 1, wherein the operations further comprise:
  determining network statistic data representing respective communications between the macro cell device and respective network devices.

7. The system of claim 6, wherein the determining the network statistic data includes using operation support system performance counters.

8. The system of claim 1, wherein the operations further comprise determining the wireless communication coverage area of the macro cell device.

9. The system of claim 8, wherein the determining the wireless communication coverage area of the macro cell device includes processing model data representing a radio frequency propagation model.

10. The system of claim 9, wherein the model data represents an implementation of an Okumura-Hata model.

11. The system of claim 4, wherein the selecting comprises selecting the location based on the third weighed value.

12. A method, comprising:
dividing, by a system comprising a processor, a wireless coverage area of a macro cell device into grids;
in response to operator data being determined to be received, via an operator input, from a user equipment within a first grid of the grids, and equipment data being determined to be received, without the operator input, from the user equipment within a second grid of the grids, mapping, by the system, the operator data to a first priority of a group of integer-based priorities and mapping, based on a power of a signal that has been received by the system, the equipment data to a second priority of the group of integer-based priorities for facilitation of a first assignment of the first priority to the first grid and a second assignment of the second priority to the second grid; and
based on the first priority and the second priority, selecting a location having a highest priority of the group of integer-based priorities for a metro cell device within the grids, wherein the metro cell device corresponds to a first emission power that is lower than a second emission power of the macro cell device.

13. The method of claim 12, further comprising:
ranking, by the system, the grids based on a network performance parameter statistic associated with a diffraction of a wireless signal that has been caused by a structure.

14. The method of claim 13, wherein the selecting further comprises:
determining two portions of the grids that are adjacent and comprise respective rankings that are determined to be similar;
grouping the two portions as a grouped portion, and
selecting the location of the metro cell based on the grouped portion.

15. The method of claim 12, further comprising:
calculating, by the system, the wireless coverage area of the macro cell device using model data representing a radio frequency propagation model.

16. The method of claim 12, wherein the macro cell device is associated with an existing cell site and the metro cell device is associated with a small cell site located under an umbrella coverage of the macro cell device.

17. A non-transitory machine-readable storage medium, comprising executable instructions that, when executed by a processor, facilitate performance of operations, comprising:
partitioning a wireless communication coverage area of a macro cell device into regions; and
based on respective rankings of the regions, generating a recommended location with a highest ranking within the regions for deployment of a metro cell device associated with a first radio frequency power emission that is lower than a second radio frequency power emission of the macro cell device, wherein a first region of the regions corresponds to a first ranking of the respective rankings that has been computed based on a first weighted value of an integer-based scale according to first data that has been received within the first region via a user input, and wherein a second region of the regions corresponds to a second ranking of the respective rankings that has been computed, with respect to a power of a received signal, based on a second weighted value of the integer-based scale according to second data that has been received within the second region without the user input.

18. The non-transitory machine-readable storage medium of claim 17, wherein the operations further comprise:
clustering two adjacent subsets of coverage areas based the wireless communication coverage area.

19. The non-transitory machine-readable storage medium of claim 17, wherein the operations further comprise:
determining a backhaul link is available at the recommended location, and wherein the backhaul link provides a communication path between the metro cell device and a carrier network device.

20. The non-transitory machine-readable storage medium of claim 17, wherein the operations further comprising ranking the regions based on a diffraction of a wireless signal that has been caused by a structure.

* * * * *